Figure 2:
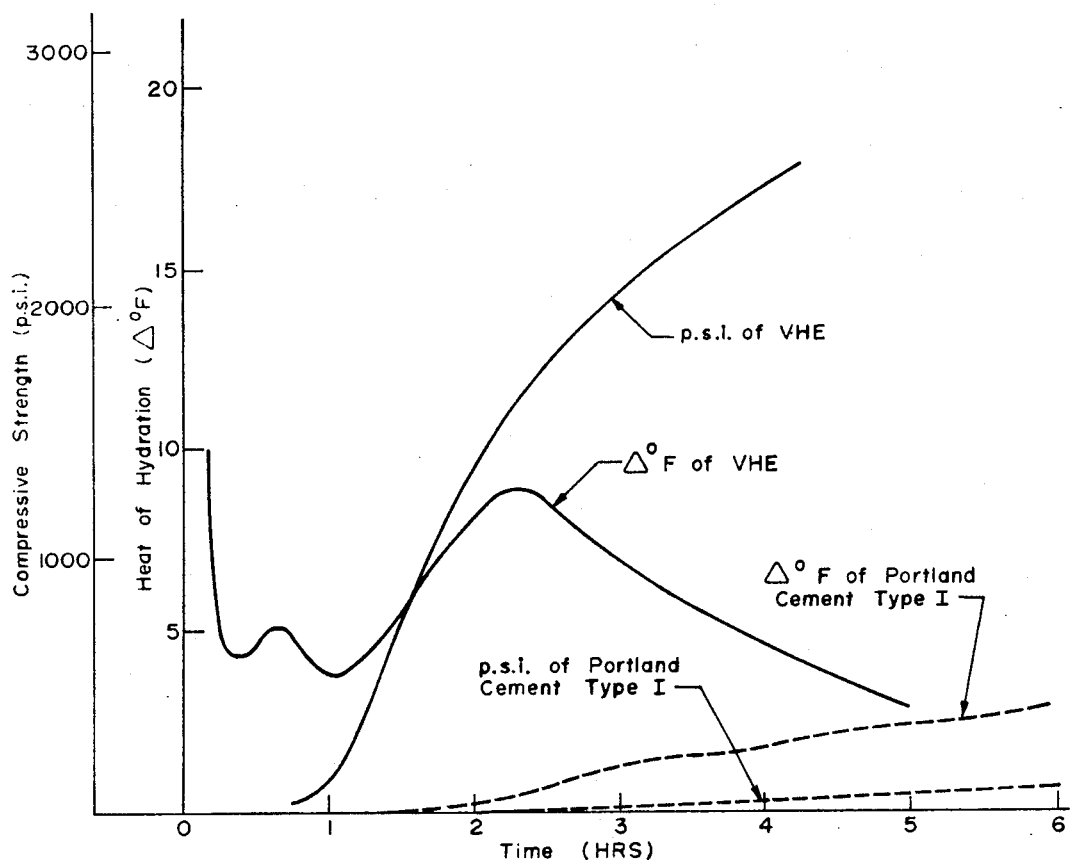

United States Patent [19]
Ost et al.

[11] 3,860,433
[45] Jan. 14, 1975

[54] VERY HIGH EARLY STRENGTH CEMENT

[76] Inventors: Borje W. A. Ost, Rt. 1 Box 357, Lake Zurich, Ill. 60047; Benedict Schiefelbein, 420 Woodbine, Fox River Grove, Ill. 60021; John M. Summerfield, 426 W. Russell Street, Barrington, Ill. 60010

[22] Filed: May 30, 1972

[21] Appl. No.: 257,629

[52] U.S. Cl. ................................. 106/89, 106/100
[51] Int. Cl. ............................................. C04b 7/04
[58] Field of Search ............. 106/89, 100, 104, 109

[56] References Cited
UNITED STATES PATENTS

| | | | |
|---|---|---|---|
| 3,147,129 | 9/1964 | Armstrong et al. | 106/109 |
| 3,251,701 | 5/1966 | Klein | 106/89 |
| 3,303,037 | 2/1967 | Klein | 106/89 |
| 3,666,515 | 5/1972 | Kakagawa | 106/314 |

*Primary Examiner*—Delbert E. Gantz
*Assistant Examiner*—James W. Hellwege
*Attorney, Agent, or Firm*—Stanton T. Hadley; Kenneth E. Roberts; Samuel Kurlandsky

[57] ABSTRACT

Fast setting hydraulic cement having very high compressive strengths within a few hours of mixing with water, and generally from about 2,900 to over 5,000 p.s.i. within 24 hours, containing beta $2CaO.SiO_2$; $3CaO.3Al_2O_3.CaSO_4$; and chemically unbound $CaSO_4$ obtained by firing at a temperature between about 1,200 and 1,600°C for about 1 to 5 hours a mixture of a source respectively of CaO, $SiO_2$, $Al_2O_3$ and $SO_3$ in proportions of about 1 to 3 moles of $CaSO_4$ to about 0.5 to 2 plus 2n moles of $CaCO_3$ per mole of $Al_2O_3.nSiO_2$ and grinding the resultant clinker.

22 Claims, 9 Drawing Figures

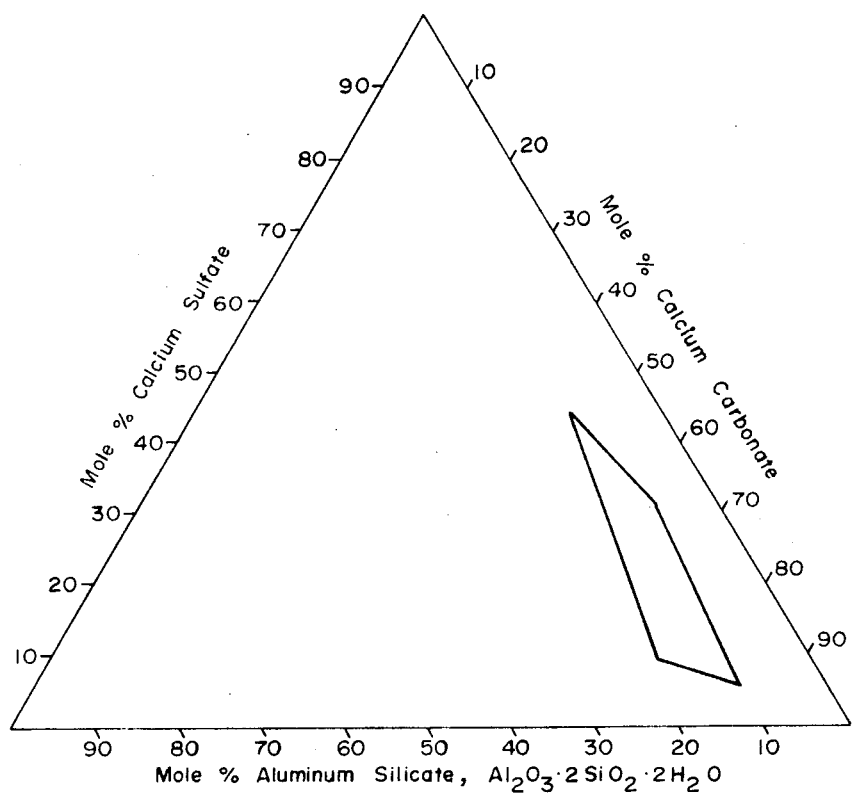
Fig. I
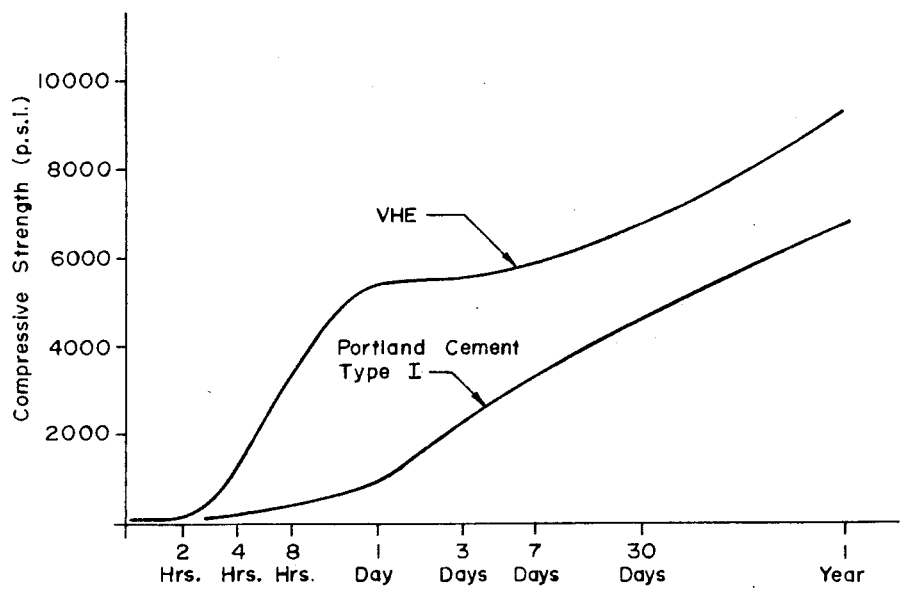
Fig. 3

VERY HIGH EARLY STRENGTH CEMENT

BACKGROUND OF THE INVENTION

FIELD OF THE INVENTION

This invention relates to fast setting cement compositions, and more particularly it relates to fast setting cement compositions which develop very high compressive strengths at early ages. Further it relates to $3CaO \cdot 3Al_2O_3 \cdot CaSO_4$ containing cements which are fast setting and will produce very high strengths at early ages, but not necessarily the characteristic expansiveness of prior $3CaO \cdot 3Al_2O_3 \cdot CaSO_4$ cements.

For convenience of further description, certain abbreviations common to cement technology may be used for fired materials, as follows:

C represents calcium oxide (CaO)
A represents aluminum oxide ($Al_2O_3$)
F represents ferric oxide ($Fe_2O_3$)
M represents magnesium oxide (MgO)
S represents silicon oxide ($SiO_2$)
K represents potassium oxide ($K_2O$)
N represents sodium oxide ($Na_2O$)
H represents water ($H_2O$)
$\bar{S}$ represents sulfur trioxide ($SO_3$)
$\bar{C}$ represents carbon dioxide ($CO_2$)

The area of hydraulic cements, or cements which harden by reacting with water and give a water resistant product, may be most typically illustrated by reference to portland cements. Portland cements are classified into five major types, by ASTM, according to chemical composition and according to properties to be achieved by the difference in chemical requirements. Type III portland cement is an early strength, quick hardening cement that differs from other types of portland cement in that the $C_3A$ and/or $C_3S$ sometimes are higher than in other types and it has higher specification limits for $SO_3$ maximum content (although the $SO_3$ is still quite low). Increased grinding must be resorted to in order to provide a more reactive product. The type III portland cement is desirable because of its early strength properties. However there is a great need to develop cements having much higher early strength to satisfy industrial needs of current construction practices. For example in construction use where a cement matrix is cast into forms, the forms are not normally available for reuse for one and often several days while the cement develops sufficient strength for removal of the form. The development of a fast setting cement having very high early strengths would allow a very early removal of the cement and early reuse of the form. Thus the same form could be used several times per day. This would also reduce the necessary curing time and necessary inventory.

A fast setting very high compressive strength cement, in the early stages of aging, would also be highly desirable for prestressed and pretension applications, particularly as such would reduce or eliminate the need for steam curing.

Such cements would be invaluable in the construction and repair of highways, which frequently requires many days and even weeks curing time before use.

Previous attempts to formulate such cements through the portland type of hydraulic cements have achieved only limited success. The type III portland cement typically develops less than 200 and 2,000 pounds per square inch compressive strength in 4 and 24 hours respectively; and generally requires from five to seven days to develop about 5,000 pounds per square inch compressive strength when tested according to ASTM C-109. Further this cement is not very sulfate resistant. Additional types of early strength hydraulic cements, such as high alumina cements, are very expensive and tend to deteriorate with age, moisture and slightly elevated temperatures.

DESCRIPTION OF THE PRIOR ART

Other types of hydraulic cements that have received much attention recently are the so called "calcium alumino sulfate" cements based on $3CaO \cdot 3Al_2O_3 \cdot CaSO_4$, often abbreviated $C_3A_3\bar{CS}$. This compound was first identified by Nobue Fukuda in 1960 (See Bull. Chem. Soc. of Japan 34:138-29, 1961, "Constitution of Sulfo Aluminous Clinker"). A characteristic of $C_3A_3\bar{CS}$ cements has heretofore been their expansiveness. A further characteristic heretofore has been the low early strength of cements containing $C_3A_3\bar{CS}$. Armstrong et al in U.S. Pat. No. 3,147,129 disclose a process for making cement from an aluminous source containing fluorine, which cement is based on $C_{12}A_7$ type material and which cement may attain high ultimate strength properties upon addition of certain additives, although high strength is not developed early and is not in any way abnormally high without such additives. Klein in U.S. Pat. No. 3,303,037 discloses certain $C_3A_3\bar{CS}$ analogs and their use as expansive additives in expansive cements. In U.S. Pat. No. 3,251,701 Klein discloses a $C_3A_3\bar{CS}$ portland type cement, which is expansive and may or may not develop early strength, and certainly does not develop very high early strength. In 1964 ASTM C150-63 specification portland cements were limited to a maximum of 4 percent $\bar{S}$. Miki U.S. Pat. No. 3,510,326 discloses $C_3A_3\bar{CS}$ containing additives to be admixed with a normal cement to obtain expansion, and the resulting materials were very expansive and did not develop high early strength, much less very high early strength.

More recent work has dealt with certain different combinations of $C_3A_3\bar{CS}$ with large amounts of $C_3S$ and $\bar{CS}$ materials produced by including $CaF_2$ or other stabilizers in the raw mix, which work did not find very high early strengths and generally concerned expansive systems ("Properties of a Cement Composed of Alite, Calcium Sulfate Aluminate, and Calcium Sulfate as Chief Constituents," S. Saito et al., *Semento Gijutso Nenpo*, vol. 23, pp. 93–99, 1969). Finally, an attempt was made to produce self-stressing concrete using the expansion of hydrating $C_3A_3\bar{CS}$ by blending physical mixtures of prepared $C_3A_3\bar{CS}$ with prepared $C_3S$ or beta $C_2S$ and a large amount of $CaSO_4$ (ratio of $CaSO_4/C_3A_3\bar{CS}$ of 8), in "The Paste Hydration of $4CaO \cdot 3Al_2O_3 \cdot SO_3$ in the Presence of Calcium Sulfate, Tricalcium Silicate and Dicalcium Silicate," M. Collepardi et al., *Cement and Concrete Research*, vol. 2, pp. 213–223, 1972. Still there is no indication of the possibility for a very high early strength cement that contains $C_3A_3\bar{CS}$.

The prior art does not appreciate how $C_3A_3\bar{CS}$ containing materials can react in the presence of water and varying amounts of lime (CaO) and calcium sulfate ($CaSO_4$). It has been shown by A. V. Volzhensky et al., ("Stroitelnye Materialy," vol. 9, 1963, pp. 31–34) that in a physical mix of high activity silica, $C_3A$ or $C_4AF$, and $\bar{CS}$ in the presence of free C formation of destructive ettringite tends to be prevented. It is believed the present invention extends this mechanism to a $C_3A_3\bar{CS}$ clinker that mainly contains beta $C_2S$, $C\bar{S}$ and some slight amount of free C.

As set forth in these patents and other prior art, it was heretofore thought that $C_3S$ and/or calcium aluminate was necessary to produce an early strength hydraulic cement. It has also heretofore been thought that cements rich in $C_3A_3C\bar{S}$ are necessarily expansive and cannot obtain very high early strengths. The explanation for this has been that when the anhydrous $C_3A_3C\bar{S}$ was hydrated it formed the high form of hydrated calcium sulfo-aluminate, also known as ettringite, $C_3A(C\bar{S})_3H_{32}$, which tends to cause disintegration of the cement.

It is known that $C_2S$ and $C_3S$ are good strength formers in hydraulic portland type cements. However generally $C_2S$ is very slow to hydrate, generally setting in over 72 hours, but producing strength over a longer period of time. $C_3S$ generally hydrates much quicker and is said to usually set in about 7 hours and almost fully hydrate within 10 hours after mixing with water. It is believed in the present invention that the very high early strengths are likely caused by an abnormally fast and complete reaction of all $C_3A_3C\bar{S}$ and $C\bar{S}$ in a low lime environment.

SUMMARY OF THE INVENTION

It is therefore an object and advantage of the present invention to provide fast setting hydraulic cements developing very high compressive strengths within a few hours after mixing with water, and which cements are stable.

Another object and advantage is the provision of fast setting hydraulic cements developing compressive strength of up to about 5,000 p.s.i. or more within 24 hours of mixing with water.

Still another object is the provision of fast setting hydraulic cements having very high compressive strengths without the addition of exotic and expensive additives.

A further object is the provision of fast setting hydraulic cements having very high compressive strengths, when hydrated, made from common, simple portland cement starting materials.

A still further object is the provision of fast setting hydraulic cements having very high compressive strengths made by firing certain mixtures of a source respectively of CaO, $SO_3$, $Al_2O_3$ and $SiO_2$.

A still further object is the provision of processes for making such very high early strength cements.

Still further objects include the provisions of fast setting hydraulic cements having very high early compressive strengths when hydrated, which cements can be formulated to have either a positive, zero, or a negative dimensional change during or after setting; which cements when hydrated can have increased sulfate resistance in comparison to other $C_3A_3C\bar{S}$ cements and to portland cements and which resistance approaches that of high alumina cements; and which cements may include certain additives or modifications for additional effects.

Figure 4:
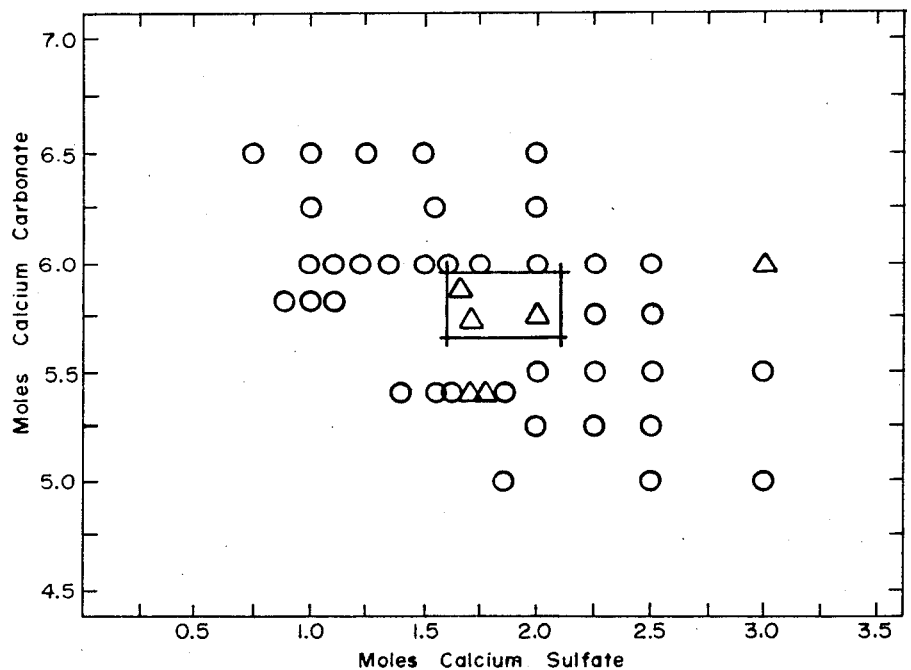
Figure 5:
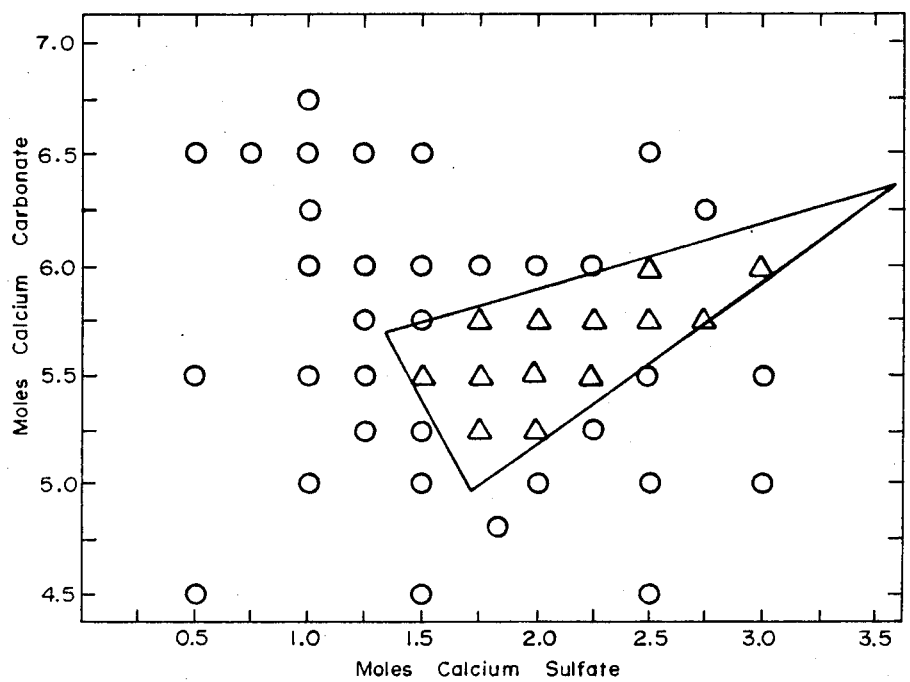
Figure 6:
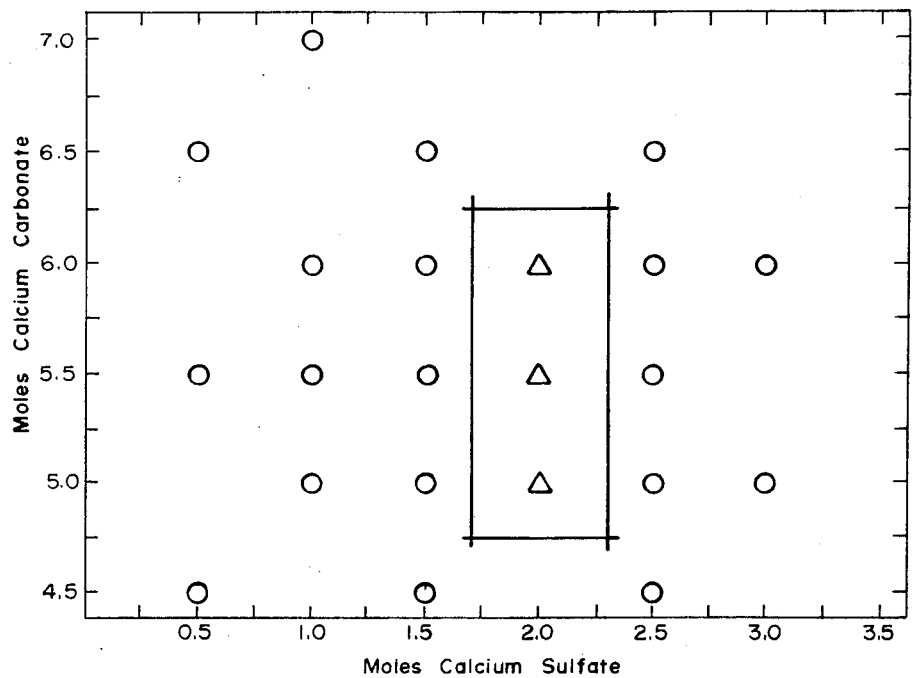
Figure 7:
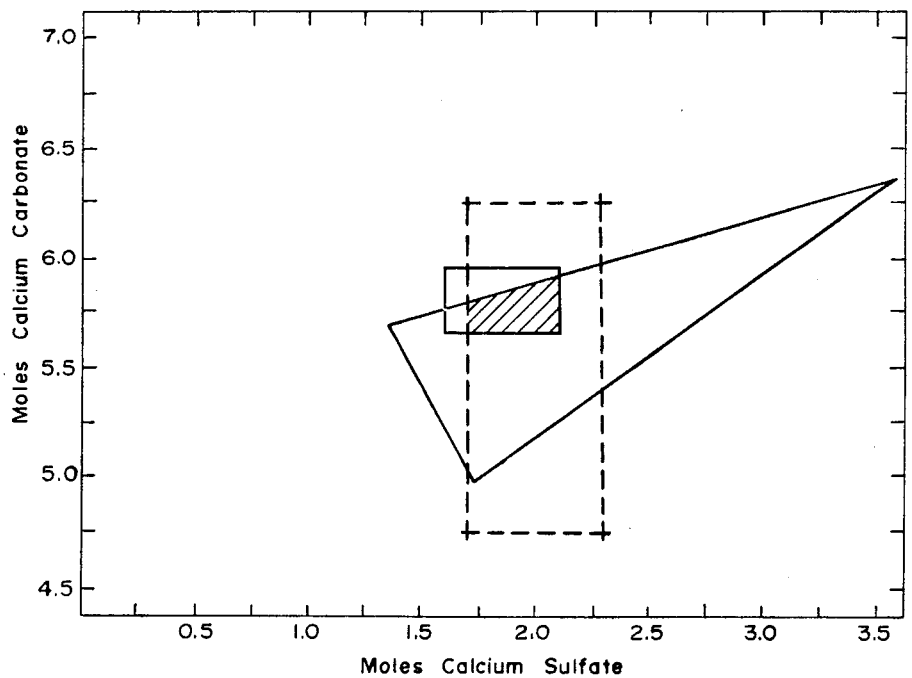
Figure 8:
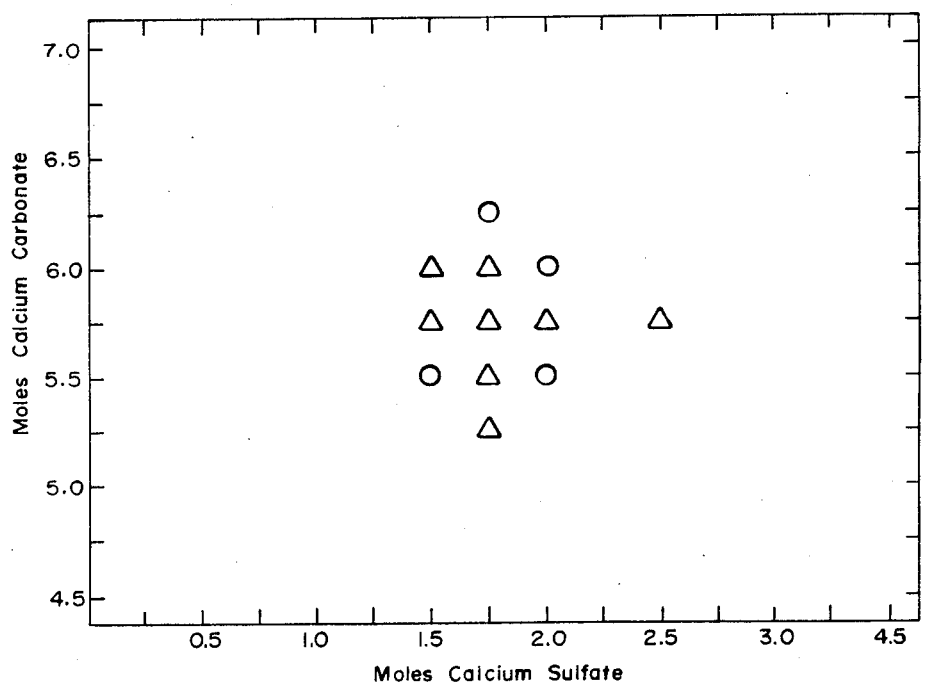
Figure 9:
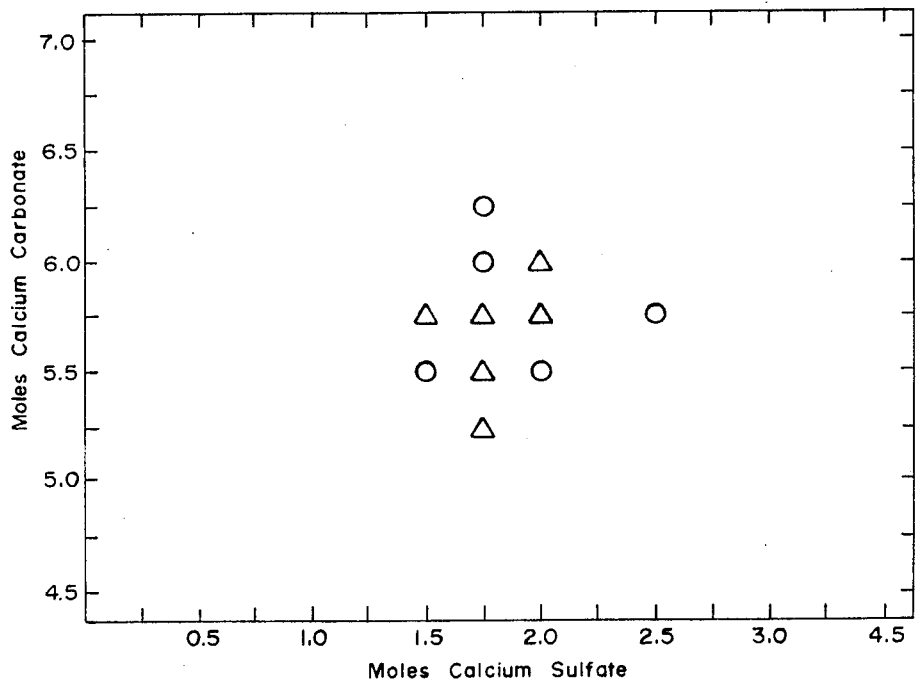

Other objects and advantages of this invention will be apparent from the ensuing more particular description and from the drawings in which:

FIG. 1 sets forth a triangular phase diagram in which is outlined stoichiometries for many cements of the present invention. However, as is usual in such diagrams, a large portion of the area outlined by these limits produces material that is not useful. FIG. 2 is a graph of heat of hydration with time elapse and of compressive strength with time elapse for a cement of this invention and type I portland cement. FIG. 3 illustrates strength development over 1 year for the cement of the invention in comparison to type I portland cement. FIG. 4 is a phase diagram of moles of $CaSO_4$ per mole of kaolin clay and moles of $CaCO_3$ per mole of kaolin clay starting materials showing compressive strengths when fired at 1,260°C and further showing compressive strengths greater than about 2,900 p.s.i. with triangular points; FIG. 5 is such a phase diagram at 1,300°C; FIG. 6 is such a phase diagram at 1,350°C; FIG. 7 is a composite of FIGS. 4 to 6 with linear definition of the areas of very high compressive strength. FIG. 8 is a phase diagram at 1,375°C; and FIG. 9 is a phase diagram at 1,450°C.

The fulfillment of the above and other objects and advantages of the present invention are accomplished by the steps of heating, at a temperature between about 1,200°C and about 1,600°C for a residence time of about 1 to about 5 hours inclusively, a mixture of a source of respectively CaO, $SiO_2$, $Al_2O_3$ and $SO_3$ such as limestone, kaolin clay, and gypsum, in effective proportions of about 1 to 3 moles inclusively of $CaSO_4$ and about (0.5 to 2 inclusively) + 2n moles of $CaCO_3$ per mole of $Al_2O_3 \cdot nSiO_2$ to produce a clinker containing major quantities of beta $C_2S$, $C_3A_3C\bar{S}$, and chemically unbound $CaSO_4$, and generally very minor amounts of free CaO; and grinding the resultant clinker.

The cements of the present invention usually can be produced to have an initial set in about 20 minutes and final set in about 30 minutes on mixing with water as measured by a Gillmore needle. For specific different uses, set time and time of strength development may be controlled over wide ranges by subsequent addition of lime or calcium sulfate. Conventional accelerators such as the various water soluble sulfates, may be included; as well as conventional retarders such as sucrose, boric acid, mucic acid and ice water. $COOH(CHOH)_4COOH$ In one of the preferred stoichiometries when $CaSO_4$ is used as a source of CaO by decomposition, 21 moles of $CaSO_4$ anhydrite plus 3 moles of kaolin clay produces a cement containing calculated 1 mole of $C_3A_3C\bar{S}$, 4.6 moles of beta $C_2S$, 2.3 moles of free $C\bar{S}$ and 0.9 moles of free C. It is noted some excess $C\bar{S}$ is needed apparently to stabilize formation of beta $C_2S$. If the $\bar{S}$ content is reduced below about 5 percent by weight then beta $C_2S$ will probably not be stabilized on cooling and can then convert to gamma $C_2S$. The formed cement, by X-ray diffraction and wet chemical analysis, has an approximate calculated composition of about 28 percent $C_3A_3C\bar{S}$; about 50 percent beta $C_2S$, about 14 percent chemically unbound $C\bar{S}$, and very minor proportions of free C. The cement has essentially no free $C_3S$ observable by X-ray diffraction. Wet chemical analysis of the cement shows about 50 percent CaO; 15 percent $SiO_2$; 15 percent $SO_3$ and 15 percent $Al_2O_3$ by weight.

A typical cement has an index of refraction of about 1.56 to 1.74. This may be compared to published data wherein the indices of refraction are as follows: $C_3A_3C\bar{S}$ = 1.569; beta $C_2S$ = 1.707, 1.715 and 1.730; and $C\bar{S}$ = 1.570, 1.575 and 1.614. The X-ray diffraction pattern of a typical cement shows spacings, including those of maximum intensities, of 4.92; 3.76; 3.50; 3.26; 2.92; 2.89; 2.86; 2.80; 2.76; 2.67; 2.66; 2.63; 2.47-2.45; 2.41; 2.35; 2.33; 2.31; 2.30; 2.20; 2.18;

2.06; 2.05; 2.04; 1.990–1.986; 1.872 and 1.745–1.742 A. The patterns show the presence of $C_3A_3C\bar{S}$; beta $C_2S$; and $C\bar{S}$. $C_3A_3C\bar{S}$ and chemically unbound $C\bar{S}$ should be present in major quantites. The relative ratio of the main $C_3A_3C\bar{S}$ peak to the $C\bar{S}$ peak seems to be a useful measure of having the cements of the present invention. Generally the ratio will be on the order of about 0.5–2.5 to 1 of $C_3A_3C\bar{S}$ to $C\bar{S}$. If these proportions are not maintained, then there may be an excess of one of these two components which does not rapidly hydrate but which may hydrate at a later time with expansion causing disintegration of the set cement.

Wet chemical analyses, for total $\bar{S}$ remaining and free C, were used to calculate cement compositions. The compositions were calculated from these analyses and the raw material starting proportions using the following assumptions: that all silica is used first for beta $C_2S$ formation; that if any F is present, it is used for $C_4AF$ formation; that remaining A is used for $C_3A_3C\bar{S}$ formation; that remaining $\bar{S}$ is used to form free $C\bar{S}$; and that any remaining C forms unallocated C.

In a number of instances, there was some unallocated C. It is believed that the most likely explanation for this is the presence of a lime rich glassy or microcrystalline phase; particularly since the X-ray diffraction analysis shows broad peaks at low angles in the cement materials of the invention. The possibility that the unallocated C is being used for the formation of $C_3S$ or other high lime silicates is unlikely since the quantities of such material based on the calculations of unallocated C would in all likelihood show up on X-ray analysis. We have not detected any $C_3S$ on the X-ray patterns for any of the cements of the present invention.

It is preferred that the cement composition contain about 20–40 percent by weight of $C_3A_3C\bar{S}$ although somewhat more or less may be present but without substantial further advantage. It is further preferred that the cement composition contain about 7–27 percent by weight of total $\bar{S}$. The amount of free $C\bar{S}$ is preferred to be in the order of 10–35 percent by weight, although more or less may be present but without further substantial advantage. Small amounts of free C are always present in the cement composition of the invention, but the amounts are variable and do not directly correlate with strength development.

We do not wish to be bound by any one theory or explanation to account for the properties of this new cement. However, it is believed that, at the temperatures of formation of the clinker, there is a partial decomposition of the $C\bar{S}$ in the presence of sources of alumina, silica, and sometimes carbon or a reducing atmosphere, to result in the generation of such amounts of free C and $C\bar{S}$ that, when the cement is ground and then hydrated, there is insufficient C and $C\bar{S}$ in combination with the $C_3A_3C\bar{S}$ to cause complete conversion of $C_3A_3C\bar{S}$ to trisulfate ettringite $C_3A(C\bar{S})_3H_{32}$, and rather some monosulfate $C_3AC\bar{S}H_{12-18}$ and possibly some calcium aluminate hydrate and or aluminum hydrates may form as stable end products. Formation of monosulfate could be favored by the presence of beta $C_2S$ rather than $C_3S$. Monosulfate formation on hydration is nonexpansive due to forming flat, plate-like crystals. By varying the ratios of raw materials or including certain additives and/or admixtures, the very high early strength cements can be made to undergo either positive, negative or zero expansion.

The sources of raw materials in the raw mix of ingredients which react to produce the cement clinker are not critical, and allow a wide choice of raw materials. Generally the $CaSO_4$ will be supplied as gypsum, the CaO will be supplied as lime or limestone and the $Al_2O_3$ will be supplied as highly aluminous clay desirably containing at least about 28 percent $Al_2O_3$. The CaO can also be obtained from marl, alkali waste, oyster shells, coquina shells, chalk, marble and the like. The $Al_2O_3$ can also be obtained from shale, fly ash, copper slag, aluminum ore refuse and the like; particularly if such sources are supplemented with added $Al_2O_3$. A crude kaolin, that is low in $Al_2O_3$, may be used with the desirable addition of supplemental amounts of bauxite or alumina and in some cases additional carbonate. Thus some minor adjustments to material stoichiometries may be desired when using crude natural materials.

The raw mix can be fired in any kiln or furnace or the like in which the temperature and residence time can be controlled. Typically the materials remain in a kiln hot zone of at least 1,200°C for at least about 10 minutes. Generally furnace temperatures of 1,200° to about 1,600°C for about 1 to 5 hours are satisfactory. Temperatures of 1,275°–1,375°C for 1-2 hours are preferred. As with other similar processes, optimum kiln or furnace temperature and retention time within the ranges set forth above will be dependent for any given stoichiometry upon the kiln or furnace atmosphere; feed form, size and rate; and any preheat measures. For example operating under an oxidizing atmosphere may call for different stoichiometries than would a reducing atmosphere. Those furnaces or kilns with preheat schedules may call for different stoichiometries for different heating rates. Feeding the raw materials in a briquette form or in different sizes may call for different stoichiometries than for powdered raw materials. By adjusting the furnace and stoichiometries through $\bar{S}$ and free C analysis of a preliminary run product, the parameters for any given furnace or kiln can be readily determined.

Typically the cement of the present invention requires similar mixing water amounts for hydration as portland cement types. The water/cement ratio can be lowered from about 0.5 to about 0.3 to produce even higher strength increases.

The fineness of grinding the clinker is not particularly critical. The clinker is easier to grind than are portland cement clinkers. Generally a Blaine fineness of about 3,650 or less is satisfactory. Of course increasing the fineness will also improve the 24 hour compressive strength just as fine grinding does for other cements. For example with the present cements, one having a 24 hour compressive strength of 3,640 p.s.i. when ground to 3,680 Blaine can have a compressive strength improvement up to about 5,400 p.s.i. when ground to 5,490 Blaine.

EXAMPLES

The following specific examples will serve further to illustrate the practice and advantages of this invention. In the following examples chemical analysis for percentage of free C and percentage of $\bar{S}$ were determined by the ASTM C-114 method and compressive strengths by the ASTM C-109 method using a water/cement ratio of 0.49. Set expansions were determined using an expansometer by the method set forth in *Ceramic Industry*, vol. 71, No. 1. July 1958, pp. 68–71 and 95, "How They Test Gypsum Cements and Plasters for the Ceramic Industry" by Robert Hamilton. Set times were determined by Gillmore needles. In preparing the samples for the set expansion tests the following procedure was used: the cement sample, and then water in a water/cement ratio of 0.4 were added to a bowl and allowed to soak for 15 seconds and form a paste. The paste was mixed for 45 seconds with a rubber spatula, poured into a plastic lined expansometer, and the first reading was taken 2 minutes after mixing was completed. The temperature rise of the hydrating cement paste samples was determined in a small plastic vial. The temperature was monitored by means of a thermocouple inserted through a small hole in the vial with a dummy specimen of similar heat capacity used as the reference. All evaluations were carried out in a 75°F-10 percent humidity room in sealed plastic bags or cups and were continued for at least 24 hours. Any variations in the test methods are shown in the specific examples hereinafter. In the ensuing specific examples the raw materials used had the following typical normalized analyses:

The calcium carbonate raw material contained 55.00% CaO; 0.12% $Al_2O_3$; 0.06% $Fe_2O_3$; 0.25% $SiO_2$ + Acid Insolubles; 0.57% MgO; 0.0035% MnO; 0.20% Free $H_2O$; 43.80% LOI (Loss on Ignition).

The gypsum ($CaSO_4 \cdot 2H_2O$) contained 32.88% CaO; 46.23% $SO_3$; 0.20% $R_2O_3$; 0.20% $SiO_2$ + Acid Insolubles; 0.27% MgO; and 20.22% combined $H_2O$.

The hemihydrate ($CaSO_4 \cdot 1/2H_2O$) contained 38.27% CaO; 54.76% $SO_3$; 0.06% $Fe_2O_3$; 0.46% $R_2O_3$; 0.12% $SiO_2$ + Acid Insolubles; 0.38% MgO; 5.44% combined $H_2O$; and 0.57% LOI.

The anhydrite ($CaSO_4$) contained 41.41% CaO; 56.27% $SO_3$; 0.05% $R_2O_3$; 0.21% $SiO_2$ + Acid Insolubles; 0.02% MgO; 0.34% combined $H_2O$; 0.04% Free $H_2O$; and 1.66% LOI.

The kaolin clay contained 37.74% $Al_2O_3$; 2.04% $Fe_2O_3$; 43.51% $SiO_2$ + Acid Insolubles; 1.37% MgO; 1.31% $TiO_2$; 0.003% Mno: 12.05% combined $H_2O$; 1.19% Free $H_2O$; and 0.79% LOI.

Santa Maria Coke

| | |
|---|---|
| Fixed Carbon | 98% |
| Maximum Volatile Material | 1% |
| Maximum Moisture | 1% |
| | 100% |

The rather pure clay and $CaSO_4$ used were desirable for experimental purposes to keep the product low in minor constitutents.

EXAMPLE 1

Preparation of Clinker No. 1

An intimate, finely divided raw mix was prepared as follows, with percentages being by weight:

| | Weight | Per Cent |
|---|---|---|
| Commercial Anhydrite | 3929 | 75.69 |
| Commercial Kaolin Clay | 1071 | 20.63 |
| Commercial Coke | 191 | 3.68 |
| | 5191 | 100.00 |

These ingredients, in powder form, were blended and fired in a slightly reducing atmosphere at about 1,340°C temperature for 2 hours in a Lindberg gas fired furnace.

The resulting clinker showed a 42% weight loss, mostly as $\bar{S}$; X-ray diffraction showed main phases as $C_3A_3C\bar{S}$; beta $C_2S$; $C\bar{S}$ and a minor amount of free C. No $C_3S$ was detected by X-ray diffraction. Wet chemical analysis showed:

| | |
|---|---|
| $SO_3$ | 11.53% |
| $SiO_2$ | 16.68% |
| CaO | 54.66% |
| $Al_2O_3$ | 14.80% |
| LOI (loss on Ignition) | 1.17% |
| $Fe_2O_3$ | 0.78% |
| MgO | 0.04% |
| $Na_2O$ | 0.01% |
| $K_2O$ | 0.06% |
| Impurities | 0.27% |
| | 100.00% |
| Free CaO | 2.28 |

When the resulting clinker was ground to 5160 Blaine fineness, a 0.4 w/c cement paste showed an initial Gillmore set in 21 minutes and final set in 28 minutes. It was noticed that the clinker was much easier to grind than portland cement clinkers and this characteristic has been typical of the cement of the present invention. When mixed into ASTM C-109 mortars, the cement possessed flow characteristics and water requirements similar to portland cements. Temperature rise measurements indicated the main strength development occurred in the first few hours after mixing, with a large amount of heat being evolved.

EXAMPLE 2

Evaluation of Cement No. 1

Cement 1 of Example 1 was compared for compressive strength with commercially available cements. Cube strengths were as follows, expressed in pounds per square inch:

| | 1 Day | 3 Day | 7 Day | 28 Day |
|---|---|---|---|---|
| Clinker No. 1 | 3500 | 5000 | 5900 | 7200 |
| Portland Cement Type I | 1000 | 2400 | 3300 | 4700 |
| Portland Cement Type III | 2600 | 4400 | 5700 | 6700 |
| High Alumina Cement | 5000 | 5500 | 5800 | 6400 |

EXAMPLE 3

Cement No. 2

This clinker was prepared from well blended mixtures of kaolin clay: calcium carbonate: hemihydrate raw materials in powder form in mole ratios of 1:5.75:1.75 respectively. Five of these mixes were fired separately in a gas fired furnace for 2 hours at 1,300°C. The clinkers showed an average weight loss of 30% and were separately ground in a ballmill. The combined cements had a fineness of 4240 Blaine and the following analyses and properties:

Chemical analysis:
SO₃ content 14.7%
Free CaO content 0.62%
Physical properties of 0.4 water/cement ratio paste:
Initial Gillmore Set          11 minutes
Final Gillmore Set            161 minutes
Set Expansion, 24 hours       0.066%
Physical Properties of Mortar, water/cement ratio 0.51:
Compressive strength, 24 hours    4600 p.s.i.
Flow                               98.8%
Expansion in gypsum water, 6 months   0.005%
Expansion in lime water, 6 months     0.002%

A calculated composition of this material shows 45.7% $C_2S$, 27.0% $C_3A_3C\bar{S}$, 18.95% $C\bar{S}$, 0.62% free CaO, and 7.7% unallocated CaO. The strength development of cement No. 2 is more fully illustrated in FIG. 2 which graphically depicts a comparison of heat-of-hydration ($\Delta°F$) and compressive strength (p.s.i.) for a typical cement of the invention (shown in solid lines labeled VHE) in comparison to a typical portland Type I cement (shown in dotted lines). Compressive strength development over a 1 year period of time is set forth graphically in FIG. 3 in which cement No. 2 is shown as VHE, a typical cement of the invention, and is compared to a type I portland cement.

Cement No. 2 was tested for dimensional stability by storing 1 inch × 1 inch × 11-¼ inch bars of ASTM C-109 mortar and tested essentially according to the procedure of ASTM C-157 in saturated gypsum water, saturated limewater, and in 50% relative humidity air. The base reading of each sample for each test was taken at 24 hours. The cement of the invention had excellent sulfate water resistance when compared to other portland cements and approaches that of high alumina cements, as shown in the following results.

| Cement | Age, months | Gypsum Water Expansion, % | Lime Water Expansion, % | Air Shrinkage, % |
|---|---|---|---|---|
| Clinker No. 2 | 3 | .042 | .038 | +.077 |
| | 6 | .046 | .040 | +.084 |
| | 9 | .051 | .031 | +.093 |
| | 12 | .055 | .041 | +.091 |
| Type I Portland | 3 | .038 | .018 | +.094 |
| | 6 | .093 | .025 | +.102 |
| | 9 | .295 | .028 | +.109 |
| | 12 | .648 | .030 | +.107 |
| High Aluminum Cement | 3 | .016 | .020 | +.082 |
| | 6 | .022 | .024 | +.096 |
| | 9 | .024 | .028 | +.098 |
| | 12 | .022 | .026 | +.096 |
| Type III Portland | 3 | .036 | .019 | +.104 |
| | 6 | .080 | .020 | +.114 |
| | 9 | .224 | .024 | +.123 |
| | 12 | .568 | .023 | +.124 |

A number of commercially available cements and cement No. 2 were stored in paper bags, for 6 months aging; then evaluated with the following results:

| Cement | W/C ratio | 6 Mo. Flow, % | Initial Flow, % | 24 Hr. Compressive Strength, p.s.i. | Relative Strength % Retained |
|---|---|---|---|---|---|
| Cement No. 2 | .504 | 134.4 | 112.0 | 2940 | 63.8 |
| Portland Type I | .479 | 106.2 | 103.9 | 670 | 46.2 |
| Portland Type III | .510 | 89.8 | 107.3 | 1200 | 33.1 |
| Portland Type V | .469 | 76.6 | 105.3 | 790 | 46.6 |
| Type S | .540 | 97.3 | 108.2 | 460 | 40.7 |
| Type K No.1 | .506 | 103.9 | 108.5 | 1060 | 45.6 |
| Type M | .494 | 62.6 | 105.4 | 800 | 58.1 |
| Reg. Set per U.S. 3,628,973 | .504 | 40.3 | 104.7 | 1130 | 24.1 |
| Type K No.2 | .527 | 104.8 | 104.6 | 520 | 27.5 |

EXAMPLE 4

Varying Calcination Time

The following procedure was used to follow the progress of the reaction to produce very high early strength cement. Five crucibles each containing 1,000 grams of a blended mix in proportions of 1 mole kaolin clay: 5.75 moles calcium carbonate: 1.75 moles calcium sulfate hemihydrate were placed in a Lindberg gas-fired furnace at about 430°C. The furnace temperature was raised at a standard rate. When the temperature reached 1,300°C, one of the crucibles was removed from the furnace, and the remaining four crucibles were removed after ½, 1, 2, and 4 hours. The analyses and calculated compositions of these cements were as follows:

| Clinker | Holding Time, hrs. | Compressive Strength, p.s.i. | Calculated Composition | | | ASTM C-114 Analysis | |
|---|---|---|---|---|---|---|---|
| | | | Beta $C_2S$ | $C_3A_3C\bar{S}$ | $C\bar{S}$ | Free CaO | $SO_3$ |
| No. 3 | 0 | — | — | — | — | 0.07 | 16.45 |
| No. 4 | ½ | 1150 | — | — | — | — | — |
| No. 5 | 1 | 4350 | 45.0 | 26.5 | 21.5 | 0.28 | 16.11 |
| No. 6 | 2 | 5250 | 45.5 | 26.9 | 19.5 | 0.54 | 15.01 |
| No. 7 | 4 | 3750 | 46.9 | 27.7 | 14.9 | 1.01 | 12.41 |

X-ray data showed that the calcium sulfate hemihydrate and calcium carbonate had completely converted to respectively $C\bar{S}$ and C in the ½ hour sample and that the reaction to form beta $C_2S$ and $C_3A_3C\bar{S}$ was essentially complete in 1 hour. The X-ray diffraction pattern of the resulting cements from firing for 1, 2 and 4 hours were very similar.

Certain of these cements were tested for performance characteristics. Cement No. 3 was not further tested because it had poor workability and did not contain sufficient desired reaction products. Results of testing on the other cements were as follows: 4,350

| Cement | Initial Gillmore Set minutes | Final Gillmore Set minutes | 24 Hr Expansion % | Compressive Strength, p.s.i. |
|---|---|---|---|---|
| No. 4 | 59 | 164 | −0.148 | 1150 |
| No. 5 | 42 | 76 | −0.260 | 4350 |
| No. 6 | 12 | 60 | −0.114 | 5250 |
| No. 7 | 9 | 47 | +0.082 | 3750 |

Although cement No. 6, calcined for 2 hours, attained the highest compressive strength, it should also be noted that the compressive strengths of cements No. 5 and No. 7 calcined for 1 and 4 hours respectively obtained 24 hour compressive strengths of 4350 and 3,750 pounds per square inch. These values are in the useful range and show that the firing time is not particularly critical to development of very high early strengths.

EXAMPLE 5

Early Hydration Products

A cement from clinker No. 6-A (similar to clinker No. 6 of Example 4 except with proportions of raw materials of 1:5.75:2.25) and a cement prepared from raw materials (1:6.25:2.75 mole ratios) outside the very high early strength range of the invention were hydrated at a 0.49 water/cement ratio as a mortar. Hydration was stopped by grinding a sample under acetone 24 hours after mixing with water. X-ray diffraction patterns showed that at this time in cement No. 6-A the $C_3A_3C\bar{S}$ and $C\bar{S}$ peaks had disappeared and an appreciable ettringite peak had appeared. Differential thermal analysis of this portion of cement No. 6-A showed a major peak at the temperature expected for ettringite (130°–150°C) and a minor peak in the area expected for monosulfate (150°–250°C). In the comparative sample, the X-ray diffraction pattern at 24 hours showed the presence of appreciable quantities of both $C_3A_3C\bar{S}$ and $C\bar{S}$ that had not reacted. The remaining portions of both samples were subjected to continued immersion in water for an additional 48 hours before quenching with acetone. The comparative sample disintegrated into a mush before the completion of the time period. Cement No. 6-A did not disintegrate and the X-ray diffraction pattern did not reveal any observable changes from the pattern at 24 hours. Peaks for beta $C_2S$ were still present, and in other evaluations beta $C_2S$ peaks were present for over three months.

EXAMPLE 6

Varying Mole Ratios and Temperatures

A number of clinkers were prepared using varying proportions of kaolin clay: calcium carbonate: hemihydrate and varying firing temperatures in the furnace as set forth in Tables 1 to 3. The crucibles for each clinker were injected into a furnace that had first been held at about 430°C for about ½ hour; then the furnace temperature was raised at a standard, nonlinear heating rate to the desired value. The crucibles were then held at the desired temperature for a specified time, then removed and allowed to air cool. Each clinker was then crushed and ballmilled to 3,500–4,000 Blaine and its cement composition calculated. Tables 1 to 3 set forth typical results at 1,260°C; 1,300°C and 1,350°C respectively. For Tables 1 to 3 a nonlinear preheat curve was used similar to the following: the crucibles are placed in a furnace held at 427°C; at 10 minute intervals the temperature is raised to the following readings: 593°C, 716°C, 816°C, 910°C, 988°C, 1,066°C, 1,104°C, 1,146°C, 1,182°C, 1,210°C, 1,232°C, 1,266°C, 1,285°C and 1,300°C, etc.

Referring more particularly to Table 1 and FIG. 4, the materials that were fired at 1,260°C illustrate materials fired towards the bottom of the reaction temperature for the present invention and thus a number of the resultant clinkers are "green," that is the reaction is only partially completed at this temperature. From Table 1 it can be seen that cements No. 16, No. 26, No. 30, No. 31, No. 33, No. 37 and No. 38 developed very high early compressive strengths. All of cements No. 8 to 48 are plotted in the phase diagram set forth as FIG. 4. In FIG. 4 and the other phase diagrams, cements which developed very high early compressive strengths are represented by a triangle symbol. Because of the low firing temperature cement No. 16, No. 33, No. 37 and No. 38 may be considered vagaries not necessarily fitting the pattern of raw material proportions. Excluding these cements from the area of raw material proportions, the phase diagram can be drawn encompassing cements No. 26, No. 30 and No. 31.

Table 1 — 1260°C

| Cement | $AS_2H_2:C\bar{C}:C\bar{S}H_{.5}$ | Compressive Strength,p.s.i. | Calculated Composition, % | | | ASTM C-114 Analysis, % | |
|---|---|---|---|---|---|---|---|
| | | | Beta $C_2S$ | $C_3A_3C\bar{S}$ | Free $C\bar{S}$ | Free CaO | $SO_3$ |
| No. 8  | 1:6.50:2.00 | 220  | 40.9 | 24.1 | 23.7 | 2.7  | 17.1 |
| No. 9  | 1:6.50:1.48 | 880  | 44.6 | 26.4 | 16.6 | 2.25 | 13.2 |
| No. 10 | 1:6.50:1.25 | 1680 | 46.1 | 27.2 | 14.5 | 2.0  | 12.1 |
| No. 11 | 1:6.50:1.00 | 2140 | 48.3 | 28.5 | 10.3 | 1.7  | 9.8  |
| No. 12 | 1:6.50:0.75 | 1110 | 50.3 | 29.7 | 7.1  | 1.7  | 8.1  |
| No. 13 | 1:6.25:2.00 | 1250 | 41.4 | 24.4 | 24.6 | 1.7  | 17.7 |
| No. 14 | 1:6.25:1.54 | 640  | 44.9 | 26.5 | 18.1 | 1.16 | 14.1 |
| No. 15 | 1:6.25:1.00 | 910  | 49.2 | 29.0 | 10.9 | 0.92 | 10.2 |
| No. 16 | 1:6.00:3.00 | 3410 | 36.5 | 21.6 | 34.2 | 1.12 | 22.9 |
| No. 17 | 1:6.00:2.50 | 1960 | 38.3 | 22.6 | 32.9 | 0.65 | 22.3 |
| No. 18 | 1:6.00:2.25 | 1600 | 41.2 | 24.3 | 25.3 | 0.82 | 18.1 |
| No. 19 | 1:6.00:1.75 | 1010 | 44.0 | 26.0 | 21.4 | 0.71 | 16.0 |

Table 1 — 1260°C

| Cement | AS$_2$H$_2$:C$\bar{\text{C}}$:C$\bar{\text{S}}$H$_{.5}$ | Compressive Strength,p.s.i. | Calculated Composition, % | | | ASTM C-114 Analysis, % | |
|---|---|---|---|---|---|---|---|
| | | | Beta C$_2$S | C$_3$A$_3$C$\bar{\text{S}}$ | Free C$\bar{\text{S}}$ | Free CaO | SO$_3$ |
| No. 20 | 1:6.00:1.6 | 1020 | 45.9 | 27.1 | 17.0 | 0.70 | 13.5 |
| No. 21 | 1:6.00:1.5 | 2150 | 46.6 | 27.5 | 16.1 | 0.75 | 13.1 |
| No. 22 | 1:6.00:1.3 | 1610 | 48.3 | 28.5 | 12.6 | 0.66 | 11.2 |
| No. 23 | 1:6.00:1.2 | 1420 | 49.2 | 29.1 | 11.5 | 0.46 | 10.6 |
| No. 24 | 1:6.00:1.1 | 2430 | 50.1 | 29.6 | 10.1 | 0.26 | 9.2 |
| No. 25 | 1:6.00:1.0 | 1650 | 50.9 | 30.0 | 9.0 | 0.08 | 9.2 |
| No. 26 | 1:5.85:1.64 | 3960 | 45.5 | 26.9 | 19.6 | 0.67 | 15.1 |
| No. 27 | 1:5.8:1.1 | 550 | 51.3 | 30.3 | 9.0 | 0.13 | 9.3 |
| No. 28 | 1:5.8:1.0 | 0 | 52.4 | 31.0 | 7.0 | 0.06 | 8.2 |
| No. 29 | 1:5.8:0.9 | 0 | 53.2 | 31.4 | 5.9 | 0.0 | 7.6 |
| No. 30 | 1:5.75:2.00 | 3190 | 43.0 | 25.4 | 24.8 | 0.37 | 17.9 |
| No. 31 | 1:5.7:1.67 | 3210 | 46.0 | 27.2 | 19.6 | 0.32 | 15.1 |
| No. 32 | 1:5.50:3.00 | 2370 | 37.6 | 22.1 | 35.3 | 0.38 | 23.7 |
| No. 33 | 1:5.50:2.50 | 2870 | 40.7 | 24.0 | 30.0 | 0.34 | 20.8 |
| No. 34 | 1:5.50:2.25 | 2260 | 42.0 | 24.8 | 28.2 | 0.22 | 19.8 |
| No. 35 | 1:5.50:2.00 | 2360 | 43.8 | 25.8 | 25.4 | 0.23 | 18.3 |
| No. 36 | 1:5.4:1.85 | 2440 | 46.7 | 27.6 | 18.9 | 0.0 | 14.7 |
| No. 37 | 1:5.4:1.75 | 3230 | 48.0 | 28.3 | 16.2 | 0.15 | 13.2 |
| No. 38 | 1:5.4:1.68 | 3180 | 48.8 | 28.8 | 14.4 | 0.87 | 12.3 |
| No. 39 | 1:5.4:1.6 | 2460 | 48.7 | 28.7 | 15.9 | 0.0 | 13.2 |
| No. 40 | 1:5.4:1.53 | 1850 | 50.1 | 29.6 | 12.5 | 0.13 | 11.2 |
| No. 41 | 1:5.4:1.38 | 1680 | 51.5 | 30.4 | 10.2 | 0.16 | 10.0 |
| No. 42 | 1:5.25:2.50 | 2000 | 41.1 | 24.2 | 31.5 | 0.18 | 21.7 |
| No. 43 | 1:5.25:2.25 | 1800 | 42.6 | 25.2 | 29.1 | 0.09 | 20.4 |
| No. 44 | 1:5.25:2.00 | 1900 | 44.6 | 26.3 | 25.8 | 0.1 | 18.6 |
| No. 45 | 1:5.00:3.00 | 1460 | 38.9 | 23.0 | 36.2 | 0.14 | 24.3 |
| No. 46 | 1:5.00:2.50 | 1700 | 41.9 | 24.7 | 31.5 | 0.09 | 21.8 |
| No. 47 | 1:5.00:1.85 | 2310 | 47.7 | 28.2 | 21.1 | 0.0 | 16.1 |

Table 2 — 1300°C

| Cement | AS$_2$H$_2$:C$\bar{\text{C}}$:C$\bar{\text{S}}$H$_{.5}$ | Compressive Strength,p.s.i. | Calculated Composition, % | | | ASTM C-114 Analysis, % | |
|---|---|---|---|---|---|---|---|
| | | | Beta C$_2$S | C$_3$A$_3$C$\bar{\text{S}}$ | Free C$\bar{\text{S}}$ | Free CaO | SO$_3$ |
| No. 48 | 1:6.75:1.00 | 1380 | 48.7 | 28.8 | 5.7 | 3.0 | 7.2 |
| No. 49 | 1:6.50:2.50 | 150 | 39.0 | 23.0 | 24.8 | 2.53 | 17.60 |
| No. 50 | 1:6.50:1.50 | 850 | 44.5 | 26.3 | 16.7 | 2.33 | 13.3 |
| No. 51 | 1:6.50:1.25 | 250 | 47.2 | 27.9 | 10.8 | 2.80 | 10.0 |
| No. 52 | 1:6.50:1.00 | 2600 | 48.6 | 28.7 | 9.3 | 2.69 | 9.2 |
| No. 53 | 1:6.50:0.75 | 1050 | 50.7 | 30.0 | 5.9 | 2.68 | 7.4 |
| No. 54 | 1:6.50:0.50 | 290 | 53.1 | 31.4 | 1.9 | 1.74 | 5.2 |
| No. 55 | 1:6.25:2.75 | 250 | 39.8 | 23.5 | 22.0 | 2.11 | 16.0 |
| No. 56 | 1:6.25:1.50 | 2380 | — | — | — | 2.10 | 13.8 |
| No. 57 | 1:6.25:1.25 | 2630 | — | — | — | 2.59 | 11.7 |
| No. 58 | 1:6.25:1.00 | 2680 | 49.8 | 29.4 | 8.8 | 1.33 | 9.1 |
| No. 59 | 1:6.00:3.00 | 3820 | 37.3 | 22.0 | 31.2 | 0.96 | 21.3 |
| No. 60 | 1:6.00:2.50 | 3920 | 39.6 | 23.4 | 28.4 | 0.84 | 19.7 |
| No. 61 | 1:6.00:2.25 | 1080 | 41.8 | 24.7 | 23.4 | 1.07 | 17.0 |
| No. 62 | 1:6.00:1.75 | 670 | 44.5 | 26.3 | 19.8 | 1.39 | 15.1 |
| No. 63 | 1:6.00:1.50 | 1530 | 46.4 | 27.4 | 16.7 | 1.11 | 13.4 |
| No. 64 | 1:6.00:1.25 | 2610 | 48.8 | 28.8 | 12.0 | 0.51 | 10.9 |
| No. 65 | 1:6.00:1.00 | 1880 | 50.7 | 29.9 | 9.6 | 0.31 | 9.6 |
| No. 66 | 1:5.75:2.75 | 3090 | 39.7 | 23.4 | 27.9 | 0.81 | 19.5 |
| No. 67 | 1:5.75:2.50 | 3630 | 39.8 | 23.5 | 30.1 | 0.66 | 20.8 |
| No. 68 | 1:5.75:2.25 | 4980 | 42.8 | 25.3 | 22.5 | 1.02 | 16.6 |
| No. 69 | 1:5.75:2 | 4070 | 44.6 | 26.3 | 19.5 | 0.61 | 14.9 |
| No. 70 | 1:5.75:1.75 | 3600 | 46.0 | 27.16 | 18.01 | 0.55 | 14.2 |
| No. 71 | 1:5.75:1.5 | 2710 | 48.1 | 28.4 | 14.5 | 0.45 | 12.3 |
| No. 72 | 1:5.75:1.25 | 2610 | 50.3 | 29.7 | 10.9 | 0.19 | 10.3 |
| No. 73 | 1:5.50:3.00 | 2160 | 39.0 | 23.0 | 30.4 | 0.77 | 20.9 |
| No. 74 | 1:5.50:2.50 | 2490 | 42.2 | 24.9 | 24.8 | 0.54 | 17.8 |
| No. 75 | 1:5.50:2.25 | 3750 | 44.0 | 26.0 | 21.6 | 0.49 | 16.1 |
| No. 76 | 1:5.50:2.00 | 3750 | 45.3 | 26.7 | 20.6 | 0.35 | 15.6 |
| No. 77 | 1:5.50:1.75 | 2820 | 47.1 | 27.8 | 17.5 | 0.31 | 14.0 |
| No. 78 | 1:5.50:1.50 | 3300 | 48.7 | 28.8 | 15.8 | 0.05 | 13.1 |
| No. 79 | 1:5.50:1.25 | 100 | 51.4 | 30.3 | 11.0 | 0.0 | 10.4 |
| No. 80 | 1:5.50:1.00 | 0 | 53.5 | 31.6 | 8.1 | 0.0 | 8.9 |
| No. 81 | 1:5.50:0.50 | 0 | 58.4 | 34.5 | 1.3 | 0.0 | 5.3 |
| No. 82 | 1:5.25:2.00 | 3620 | 47.1 | 27.8 | 17.6 | 0.45 | 14.0 |
| No. 83 | 1:5.25:1.75 | 3340 | 49.0 | 28.9 | 14.9 | 0.10 | 12.5 |
| No. 84 | 1:5.25:1.50 | 2380 | 50.3 | 29.7 | 14.3 | 0.0 | 12.3 |
| No. 85 | 1:5.25:1.25 | 20 | 52.9 | 31.2 | 9.8 | 0.0 | 9.9 |
| No. 86 | 1:5.00:3.00 | 1880 | 40.8 | 24.1 | 29.6 | 0.33 | 20.6 |
| No. 87 | 1:5.00:2.50 | 1610 | 44.3 | 26.2 | 23.5 | 0.37 | 17.3 |
| No. 88 | 1:5.00:2.00 | 2010 | 48.2 | 28.4 | 17.5 | 0.09 | 14.01 |
| No. 89 | 1:5.00:1.50 | 2020 | 51.7 | 30.5 | 13.4 | 0.0 | 11.9 |
| No. 90 | 1:5.00:1.00 | 0 | 57.0 | 33.6 | 5.3 | 0.0 | 7.6 |

Table 3 — 1350°C

| Cement | $AS_2H_2:C\bar{C}:C\bar{S}_{.5}$ | Compressive Strength, p.s.i. | Calculated Composition, % | | | ASTM C-114 Analysis, % | |
|---|---|---|---|---|---|---|---|
| | | | Beta $C_2S$ | $C_3A_3C\bar{S}$ | Free $C\bar{S}$ | Free CaO | $SO_3$ |
| No. 91 | 1:7.00:1.00 | 1540 | 47.0 | 27.8 | 8.1 | 3.77 | 8.4 |
| No. 92 | 1:6.50:2.50 | Glassy Clinker | — | — | — | — | — |
| No. 93 | 1:6.50:1.50 | 2000 | 45.4 | 26.8 | 13.8 | 2.66 | 11.7 |
| No. 94 | 1:6.50:0.50 | Unable to place | 53.6 | 31.6 | 0.3 | 0.29 | 4.3 |
| No. 95 | 1:6.00:3.00 | Glassy Clinker | — | — | — | — | — |
| No. 96 | 1:6.00:2.50 | 460 | 40.5 | 23.9 | 24.9 | 1.21 | 17.8 |
| No. 97 | 1:6.00:2.00 | 3710 | 44.4 | 26.2 | 17.1 | 1.14 | 13.5 |
| No. 98 | 1:6.00:1.50 | 2450 | 47.3 | 27.9 | 13.6 | 1.17 | 11.7 |
| No. 99 | 1:6.00:1.00 | Unable to place | 51.9 | 30.7 | 5.6 | 0.69 | 7.3 |
| No. 100 | 1:5.5:2.50 | Glassy Clinker | — | — | — | — | — |
| No. 101 | 1:5.5:2.00 | 2910 | 46.8 | 27.6 | 15.3 | 1.06 | 12.6 |
| No. 102 | 1:5.5:1.50 | 850 | 51.0 | 30.1 | 8.5 | 0.97 | 8.9 |
| No. 103 | 1:5.5:1.00 | 10 | 55.0 | 32.5 | 3.5 | 0.00 | 6.3 |
| No. 104 | 1:5.5:0.50 | 930 | 59.7 | 35.2 | — | 0.00 | 3.2 |
| No. 105 | 1:5.0:3.00 | Glassy Clinker | — | — | — | — | — |
| No. 106 | 1:5.0:2.50 | 2450 | 44.5 | 26.3 | 22.9 | 0.54 | 16.9 |
| No. 107 | 1:5.0:2.00 | 3270 | 49.3 | 29.1 | 14.0 | 0.60 | 12.1 |
| No. 108 | 1:5.0:1.50 | 5 | 54.0 | 31.9 | 6.6 | 0.03 | 8.0 |
| No. 109 | 1:5.0:1.00 | 10 | 59.5 | 35.1 | — | 0.00 | 3.5 |
| No. 110 | 1:4.5:2.50 | 1900 | 47.9 | 28.3 | 18.5 | 0.47 | 14.6 |
| No. 111 | 1:4.5:1.50 | 2050 | 56.8 | 33.6 | 5.9 | 0.00 | 7.8 |
| No. 112 | 1:4.5:0.50 | 0 | 67.4 | 39.8 | — | 0.00 | 1.7 |

As set forth in FIG. 4 this is the area defined in the phase diagram by lines that are a function of X and Y wherein Y is the moles of $CaCO_3$ or its equivalent per mole of kaolin clay or its equivalent; and X is the moles of $CaSO_4$ or its equivalent per mole of kaolin clay or its equivalent. Thus, from FIG. 4 it can be seen that the primary concentration area of starting raw materials is defined between about Y=5.65 and 5.95 and X=1.6 and 2.1.

Results, analyses, and the phase diagram for 1,300°C are presented in Table 2 and FIG. 5. Table 2 shows that cements No. 59, No. 60, No. 66 to 70, No. 75 to 78, No. 82 and No. 83 developed very high early compressive strengths. Plotting these cements in the phase diagram of FIG. 5 resulted in a triangular area whose vertices correspond to $X_1$=1.72, $Y_1$=4.96; $X_2$=3.62, $Y_2$=6.38; and $X_3$=1.33, $Y_3$=5.68. This triangle in FIG. 5 covers the area bounded by the following equations:

$$0.7X - 2.29Y + 12.0762 = 0$$

$$0.72X + 0.39Y - 3.1728 = 0; \text{ and}$$

$$1.42X - 1.9Y + 6.9816 = 0$$

Referring to Table 2 and FIG. 5, it can be seen that cements No. 61 to 65 and No. 71 to 74 fell outside of the area of very high compressive strength cements because the mole ratios of calcium carbonate and hemihydrate were too high. Similarly, cements No. 78 to 81 and No. 85 to 90 fell outside the area of very high compressive strength cements because they were too low in calcium carbonate and too high in hemihydrate.

At 1,350°C, not as many different proportions were evaluated, as can be seen from Table 3 and FIG. 6. At this temperature and under the specific heat rate and kiln atmosphere, the particular material stoichiometries appear to be approaching an upper temperature limit.

The phase diagrams at 1,260°C, 1,300°C and 1,350°C were combined into a composite phase diagram, FIG. 7. The shaded area in FIG. 7 represents a common area of proportions for these firing conditions giving very high early strength cements. The common area is defined between $$0.7X - 2.29Y + 12.0762 = 0$$

$$X = 1.7$$

$$Y = 5.65$$

$$X = 2.1$$

In a further embodiment, another series of clinkers were prepared using varying proportions of kaolin clay, calcium carbonate, and hemihydrate in the form of briquettes in a gas fired furnace that had a standardized linear preheat temperature rise of 1.38°C/minute and final temperatures of 1,375°C and 1,450°C, with typical results set forth in Tables 4 and 5 respectively and FIGS. 8 and 9 respectively. In these Tables and Figures only a few proportions were evaluated and they show that different higher temperature ranges are more optimum with changes in feed form, preheat measures and kiln atmosphere. As with other such processes, optimum kiln or furnace temperature and retention time within the ranges cited will depend on the kiln or furnace atmosphere for a given stoichiometry; feed form, size and rate; and any preheat measures.

EXAMPLE 7

Effect of $Fe_2O_3$

Well blended raw mixes containing kaolin clay, calcium carbonate, hemihydrate and either 0, 1, 2, or 3% $Fe_2O_3$, all in powdered form, were fired for 2 hours at 1,300°C in a gas furnace after a standard heat-up cycle. The clinkers were ground to a Blaine fineness of 3,500–4,000 square centimeters per gram. The chemical analyses and properties of these cements are set forth in Table 6.

Table 4 — 1375°C

| Cement | $AS_2H_2:C\bar{C}:C\bar{S}_{.5}$ | Compressive Strength, p.s.i. | Calculated Composition, % | | | ASTM C-114 Analysis, % | |
|---|---|---|---|---|---|---|---|
| | | | Beta $C_2S$ | $C_3A_3C\bar{S}$ | Free $C\bar{S}$ | Free CaO | $SO_3$ |
| No. 113 | 1:6.25:1.75 | 530 | 44.01 | 25.99 | 18.48 | 1.60 | 14.28 |
| No. 114 | 1:6.00:2.00 | 630 | 45.54 | 26.89 | 13.21 | 1.99 | 11.30 |
| No. 115 | 1:6.00:1.75 | 940 | 45.78 | 27.03 | 15.58 | 0.87 | 12.71 |

Table 4 — 1375°C

| Cement | $AS_2H_2:C\bar{C}:C\bar{S}_s$ | Compressive Strength, p.s.i. | Calculated Composition, % | | ASTM C-114 Analysis, % | | |
|---|---|---|---|---|---|---|---|
| | | | Beta $C_2S$ | $C_3A_3C\bar{S}$ | Free $C\bar{S}$ | Free CaO | $SO_3$ |
| No. 116 | 1:6.00:1.50 | 4610 | 46.74 | 27.60 | 15.55 | 0.51 | 12.77 |
| No. 117 | 1:5.75:2.25 | 5420 | 42.51 | 25.10 | 23.66 | 0.71 | 17.21 |
| No. 118 | 1:5.75:2.00 | 6140 | 44.18 | 26.09 | 20.97 | 1.06 | 15.76 |
| No. 119 | 1:5.75:1.75 | 5560 | 46.13 | 27.24 | 17.57 | 0.44 | 13.91 |
| No. 120 | 1:5.75:1.50 | 3880 | 48.34 | 28.55 | 13.60 | 0.51 | 11.75 |
| No. 121 | 1:5.50:2.00 | 2380 | 45.11 | 26.64 | 20.95 | 0.76 | 15.82 |
| No. 122 | 1:5.50:1.75 | 4450 | 47.63 | 28.12 | 15.93 | 0.36 | 13.06 |
| No. 123 | 1:5.50:1.50 | 2300 | 49.86 | 29.44 | 12.15 | 0.33 | 11.01 |
| No. 124 | 1:5.25:1.75 | 3790 | 48.73 | 28.78 | 15.71 | 0.22 | 13.02 |

Table 5 — 1450°C

| Cement | $AS_2H_2:C\bar{C}:C\bar{S}_s$ | Compressive Strength, p.s.i. | Calculated Composition, % | | ASTM C-114 Analysis, % | | |
|---|---|---|---|---|---|---|---|
| | | | Beta $C_2S$ | $C_3A_3C\bar{S}$ | Free $C\bar{S}$ | Free CaO | $SO_3$ |
| No. 125 | 1:6.25:1.75 | 1250 | 45.08 | 26.62 | 14.80 | 1.76 | 12.20 |
| No. 126 | 1:6.00:2.00 | 2800 | 44.01 | 25.99 | 18.48 | 0.75 | 14.28 |
| No. 127 | 1:6.00:1.75 | 1950 | 45.76 | 27.02 | 15.65 | 1.10 | 12.75 |
| No. 128 | 1:6.00:1.50 | 2670 | Samples not analyzed | | | | |
| No. 129 | 1:5.75:2.25 | 2400 | 42.99 | 25.38 | 22.01 | 0.76 | 16.28 |
| No. 130 | 1:5.75:2.00 | 3250 | 45.07 | 26.61 | 17.96 | 0.41 | 14.06 |
| No. 131 | 1:5.75:1.75 | 3350 | 46.25 | 27.31 | 17.18 | 0.39 | 13.69 |
| No. 132 | 1:5.75:1.50 | 3200 | 48.03 | 28.36 | 14.63 | 0.32 | 12.33 |
| No. 133 | 1:5.50:2.00 | 2450 | 46.17 | 27.26 | 17.44 | 1.47 | 13.84 |
| No. 134 | 1:5.50:1.75 | 3500 | 47.14 | 27.83 | 17.50 | 0.30 | 13.95 |
| No. 135 | 1:5.50:1.50 | 1680 | 50.23 | 29.66 | 10.98 | 0.30 | 10.35 |
| No. 136 | 1:5.25:1.75 | 3900 | 48.79 | 28.81 | 15.53 | 0.15 | 12.92 |

Table 6 — Effect of $Fe_2O_3$

| Cement | $AS_2H_2:C\bar{C}:C\bar{S}_s$ | $Fe_2O_3$, % | 24 Hr. Expansion, % | Analysis | | Compressive Strength, p.s.i. | | Gillmore Set, Minutes | |
|---|---|---|---|---|---|---|---|---|---|
| | | | | Free CaO, % | $SO_3$, % | 1-day | 7-day | 1st | 2nd |
| No. 137 | 1:5.75:1.75 | 0 | +.066 | 0.62 | 14.69 | 5420 | 5950 | 130 | 180 |
| No. 138 | 1:6.00:1.75 | 0 | +.306 | 1.39 | 15.09 | 670 | 0 | 20 | 40 |
| No. 139 | 1:5.75:1.75 | 1 | −.206 | 0.24 | 13.51 | 3950 | 4580 | 82 | 117 |
| No. 140 | 1:6.00:1.75 | 1 | −.264 | 0.41 | 15.50 | 3770 | 4560 | 72 | 127 |
| No. 141 | 1:6.00:2.00 | 1 | −.081 | 0.69 | 15.59 | 4420 | 5870 | 8 | 77 |
| No. 142 | 1:6.25:1.75 | 1 | +.199 | 0.77 | 14.95 | 2520 | 3340 | 20 | 180 |
| No. 143 | 1:6.50:1.75 | 1 | +1.27 | 1.99 | 14.19 | 310 | 0 | 12 | 32 |
| No. 144 | 1:5.75:1.75 | 2 | −.134 | 0.00 | 13.64 | 3120 | 5470 | 157 | 180 |
| No. 145 | 1:6.00:1.75 | 2 | −.478 | 0.08 | 15.32 | 2600 | 4020 | 96 | 152 |
| No. 146 | 1:6.00:2.00 | 2 | −.232 | 0.21 | 14.46 | 2620 | 4350 | 95 | 180 |
| No. 147 | 1:6.25:1.75 | 2 | −.214 | 0.21 | 13.62 | 3430 | 4450 | 47 | 152 |
| No. 148 | 1:6.50:1.75 | 2 | +.017 | 0.69 | 14.95 | 4200 | 6550 | 13 | 112 |
| No. 149 | 1:6.75:1.75 | 2 | +.558 | 1.00 | 13.80 | 460 | 0 | 11 | 21 |
| No. 150 | 1:5.75:1.75 | 3 | −.192 | 0.00 | 11.97 | 3000 | 4870 | 152 | 180 |
| No. 151 | 1:6.00:1.75 | 3 | −.242 | 0.00 | 14.27 | 2600 | 4460 | 137 | 180 |
| No. 152 | 1:6.00:2.00 | 3 | −.179 | 0.13 | 15.67 | 2480 | 3750 | 116 | 180 |
| No. 153 | 1:6.25:1.75 | 3 | −.256 | 0.00 | 13.20 | 2580 | 3650 | 120 | 180 |
| No. 154 | 1:6.50:1.75 | 3 | −.313 | 0.27 | 14.46 | 2940 | 4620 | 42 | 120 |
| No. 155 | 1:6.75:1.75 | 3 | −.085 | 0.35 | 12.90 | 4550 | 4700 | 9 | 72 |
| No. 156 | 1:7.00:1.75 | 3 | +.492 | 0.67 | 13.60 | 390 | 0 | 15 | 35 |

These data show that very high strengths are available when the raw mix contains as much as 3 percent of one of the most common clay impurities, $Fe_2O_3$, based on the total weight of dry raw ingredients. When more than 3 percent $Fe_2O_3$ was added to the raw mix, the cement showed signs of melting, which tendency can be overcome by using shorter calcination times or lower calcination temperatures. Generally addition of $Fe_2O_3$ to cements of the optimum formulation (cements No. 137, No. 139, No. 144 and No. 150) decreased the compressive strengths. Increasing the $CaCO_3$ mole ratio, by generally about 0.4 additional moles of $CaCO_3$ per each percent of $Fe_2O_3$ that was added to the blend, resulted in cement which approached the total $\bar{S}$ and free C chemical analysis and 24 hour compressive strength of the normal optimum formulation. This is evident in cements No. 140, No. 147, No. 148, No. 154 and No. 155.

EXAMPLE 8

Comparison of Top and Bottom Halves of a Clinker

A number of cement clinkers were obtained using raw material proportions as set forth for cement No. 70 in Example 6 by calcining for 2 hours at 1,300°C. Then a number of the samples were sawed in half to present a top half and a bottom half, ground to a Blaine fineness of 3,640, and analyzed for a number of properties. As a control, a number of the samples were not sawed in half before being ground and tested. Test results are set forth in Table 7.

Although the analysis of the entire clinker was between that for the top half and that for the bottom half, surprisingly the properties of neither the top half nor the bottom half were in any way as good as cement prepared from the entire clinker. It is postulated that there is some mechanism occurring on hydration in the cement of the present invention that is entirely different and unexpected from what one would reasonably expect to occur from the use of these common starting materials in the particular proportions as used herein.

Table 7

| Sample | Compressive Strength, p.s.i. | | ASTM C-114 Analysis | | Gillmore Set, minutes | | 24 Hr. Expansion, % |
|---|---|---|---|---|---|---|---|
| | 24 hr. | 7 day | Total SO$_3$% | free CaO, % | 1st | 2nd | |
| Top half of clinker No. 157 | 513 | 1575 | 14.42 | 1.49 | 18 | 30 | +.645 |
| Bottom half of clinker No. 157 | 2690 | 3838 | 15.29 | 0.00 | 75 | 135 | −.153 |
| Whole clinker | 5420 | — | 14.69 | 0.62 | 130 | 180 | +.066 |

While the present invention has been described and exemplified with respect to certain embodiments, it is not to be considered limited thereto; and it is understood that variations and modifications thereof, obvious to those skilled in the art, may be made without departing from the spirit or scope of this invention. For example known workability, air entrainment and other additives and adjustments may be included for their known effects.

What is claimed is:

1. A fast-setting hydraulic cement which rapidly develops strength and which has a compressive strength of at least about 2,900 pounds per square inch within 24 hours after initiation of hydration, containing from about 20 percent to about 40 percent by weight of C$_3$A$_3$C$\bar{S}$ and from about 10 percent to about 35 percent by weight of chemically unbound CaSO$_4$, and the remainder being substantially beta C$_2$S.

2. The cement of claim 1 in which the compressive strength is at least 4,000 p.s.i. within 24 hours after initiation of hydration when tested by ASTM C-109 using a 0.49 water/cement ratio.

3. The cement composition of claim 1 including a small amount of free CaO.

4. The cement composition of claim 1, being essentially free from C$_3$A and C$_3$S detectable by X-ray diffraction.

5. The cement composition of claim 1 in which the relative ratio of C$_3$A$_3$C$\bar{S}$ to C$\bar{S}$ by X-ray diffraction pattern peaks is about 0.5-2.5 to 1 respectively.

6. The cement composition of claim 1 which has an X-ray diffraction pattern that shows spacings of about 4.92; 3.76; 3.50; 3.26; 2.92; 2.89; 2.86; 2.80; 2.76; 2.67; 2.66; 2.63; 2.47-2.45; 2.41; 2.35; 2.33; 2.31; 2.30; 2.20; 2.18; 2.06; 2.05; 2.04; 1.990-1.986; 1.872; and 1.745-1.742 A.

7. The cement composition of claim 1 which has a calculated composition based on wet chemical analysis of about 28% C$_3$A$_3$C$\bar{S}$; about 50 percent beta C$_2$S; about 14 percent chemically unbound C$\bar{S}$; and minor proportions of free C, the amount of such C$\bar{S}$ exceeding the amount of such C and their total being about 14 to about 35 percent.

8. The cement composition of claim 7 and having an X-ray diffraction pattern that shows spacings of about 4.92; 3.76; 3.50; 3.26; 2.92; 2.89; 2.86; 2.80; 2.76; 2.67; 2.66; 2.63; 2.47-2.45; 2.41; 2.35; 2.33; 2.31; 2.30; 2.20; 2.18; 2.06; 2.05; 2.04; 1.990-1.986; 1.872; and 1.745-1.742 A.

9. A feed mixture for a fast-setting hydraulic cement which rapidly develops strength and which has a compressive strength of at least about 2,900 p.s.i. within 24 hours after initiation of hydration after being fired to a clinker at a temperature between about 1,200° and 1,600°C for about 1 to 5 hours residence time; comprising a mixture of sources respectively of CaO, SiO$_2$, Al$_2$O$_3$ and SO$_3$ in proportions of about 1 to 3 moles of CaSO$_4$ and about (0.5 to 2) + 2n moles of CaO per mole of Al$_2$O$_3$.nSiO$_2$ where n is about 1.5 to about 2.5.

10. The feed mixture of claim 9 in which the sources of CaO, SiO$_2$, Al$_2$O$_3$ and SO$_3$ comprise limestone, kaolin clay, and gypsum.

11. The feed mixture of claim 9 in which the proportions are about 1.75 moles of CaSO$_4$ and about 5.75 moles of CaO per mole of Al$_2$O$_3$.nSiO$_2$ where n is 2.

12. The feed mixture of claim 9 in which the sources are fired at a temperature of about 1,260°C and the proportions are about 1.6-2.1 moles of CaSO$_4$ and about 5.65-5.95 moles of CaO per mole of Al$_2$O$_3$.nSiO$_2$ where n is 2.

13. The feed mixture of claim 9 in which the sources are fired at a temperature of about 1,300°C; and the proportions are in the area enclosed by the equations:

$$0.7X - 2.29Y + 12.0762 = 0$$
$$0.72X + 0.39Y - 3.1728 = 0; \text{ and}$$
$$1.42X - 1.9Y + 6.9816 = 0$$

wherein Y represents the moles of CaO per mole of Al$_2$O$_3$ and X represents the moles of CaSO$_4$ per mole of Al$_2$O$_3$.nSiO$_2$ where n is 2.

14. The feed mixture of claim 9 in which the sources are fired at a temperature of about 1,350°C; and the proportions are about 1.7-2.8 moles of CaSO$_4$ and about 4.75 to 6.25 moles. of CaO per mole of Al$_2$O$_3$.nSiO$_2$ where n is 2.

15. A process for preparing a fast-setting hydraulic cement which rapidly develops strength and which has a compressive strength of at least about 2,900 p.s.i. within 24 hours after initiation of hydration comprising:

forming a mixture of sources respectively of CaO, SiO$_2$, Al$_2$O$_3$ and SO$_3$ in proportions of about 1-3 moles of CaSO$_4$ and about (0.5 to 2) + 2n moles of CaO per mole of Al$_2$O$_3$.nSiO$_2$ where n is about 1.5 to about 2.5; and firing the mixture at a temperature between about 1,200°C and about 1,600°C for a residence time of about 1 to about 5 hours.

16. The process of claim 15 in which the source materials are in proportions of about 1.75 moles of CaSO$_4$ and about 5.75 moles of CaO per mole of Al$_2$O$_3$.nSiO$_2$ where n is 2.

17. The process of claim 15 in which the firing is at about 1,260°C and the proportions are about 1.6–2.1 moles of $CaSO_4$ and about 5.65–5.95 moles of CaO per mole of $Al_2O_3 \cdot nSiO_2$ where $n$ is 2.

18. The process of claim 15 in which the firing is at about 1,300°C and the proportions are about in the area enclosed by the equations:

$$0.7X - 2.29Y + 12.0762 = 0$$
$$0.72X + 0.39Y - 3.1728 = 0; \text{ and}$$
$$1.42X - 1.9Y + 6.9816 = 0$$

wherein Y represents the moles of CaO per mole of $Al_2O_3$ and X represents the moles of $CaSO_4$ per mole of $Al_2O_3 \cdot nSiO_2$ where $n$ is 2.

19. The process of claim 15 in which the firing is at about 1,350°C and the proportions are about 1.7–2.8 moles of $CaSO_4$ and about 4.75–6.25 moles of CaO per mole of $Al_2O_3 \cdot nSiO_2$ where $n$ is 2.

20. The process of claim 15 including the step of grinding the resultant clinker.

21. The process of claim 15 in which $CaSO_4$ is used as source of CaO by decomposition including the steps of forming a mixture of about 7 moles of $CaSO_4$ per mole of $Al_2O_3$; and firing the mixture in a reducing atmosphere.

22. The process of claim 21 in which coke is included in the mixture to provide a reducing atmosphere.

* * * * *